(12) United States Patent  
Greiter

(10) Patent No.: US 10,480,637 B2  
(45) Date of Patent: Nov. 19, 2019

(54) LUBRICATION SYSTEM FOR A DRIVE DEVICE OF A MOTOR VEHICLE

(71) Applicant: AUDI AG, Ingolstadt (DE)

(72) Inventor: Ivo Greiter, Eitensheim (DE)

(73) Assignee: AUDI AG, Ingolstadt (DE)

( * ) Notice: Subject to any disclaimer, the term of this patent is extended or adjusted under 35 U.S.C. 154(b) by 233 days.

(21) Appl. No.: 15/523,823

(22) PCT Filed: Nov. 3, 2015

(86) PCT No.: PCT/EP2015/075506  
§ 371 (c)(1),  
(2) Date: May 2, 2017

(87) PCT Pub. No.: WO2016/071300  
PCT Pub. Date: May 12, 2016

(65) Prior Publication Data  
US 2017/0343099 A1 Nov. 30, 2017

(30) Foreign Application Priority Data  
Nov. 3, 2014 (DE) .................. 10 2014 016 173

(51) Int. Cl.  
*F16H 57/04* (2010.01)

(52) U.S. Cl.  
CPC ....... *F16H 57/0441* (2013.01); *F16H 57/045* (2013.01); *F16H 57/0442* (2013.01); *F16H 57/0456* (2013.01)

(58) Field of Classification Search  
CPC ............. F16H 57/0434; F16H 57/0441; F16H 57/0442; F16H 57/0443; F16H 57/0445; F16H 57/0446; F16H 57/0453  
See application file for complete search history.

(56) References Cited

U.S. PATENT DOCUMENTS

| | | |
|---|---|---|
| 2,599,215 A | 6/1952 | Wemp |
| 2,743,789 A | 5/1956 | Ferguson et al. |
| 2,807,340 A | 9/1957 | Butterworth |
| 3,800,913 A | 4/1974 | Schmitt |
| 3,857,461 A | 12/1974 | Schmitt |
| 4,037,687 A * | 7/1977 | Krutz .................. F16H 57/0434 184/6.4 |
| 4,169,519 A | 10/1979 | Hirt et al. |

(Continued)

FOREIGN PATENT DOCUMENTS

| | | |
|---|---|---|
| CN | 102537296 A | 7/2012 |
| CN | 102767618 A | 11/2012 |

(Continued)

OTHER PUBLICATIONS

European Office Action dated May 15, 2018, in connection with corresponding EP Application No. 15 794 499.2 (5 pgs.).

(Continued)

*Primary Examiner* — Minh Truong  
(74) *Attorney, Agent, or Firm* — Maier & Maier, PLLC

(57) ABSTRACT

A drive device for a motor vehicle having a drive assembly that is operatively connected or can be operatively connected to an input shaft of a gearbox. A gear set of the gearbox can be supplied with lubricant by a primary lubricant pump. The primary lubricant pump is coupled to an output shaft of the gearbox.

7 Claims, 1 Drawing Sheet

(56) References Cited

U.S. PATENT DOCUMENTS

| | | | |
|---|---|---|---|
| 4,416,168 A | 11/1983 | Arai et al. | |
| 4,658,665 A * | 4/1987 | Strinzel | F16H 57/0442 184/6.12 |
| 4,693,133 A | 9/1987 | Tomita et al. | |
| 4,922,765 A | 5/1990 | Hayakawa et al. | |
| 5,099,715 A * | 3/1992 | Baiker | F16H 57/0413 184/6.12 |
| 5,121,815 A * | 6/1992 | Francois | B64C 27/12 184/6.12 |
| 5,544,540 A | 8/1996 | Holman | |
| 5,662,188 A * | 9/1997 | Ito | B62D 5/07 184/11.1 |
| 6,644,439 B2 * | 11/2003 | Schnitzer | F01M 1/02 184/106 |
| 9,624,798 B2 * | 4/2017 | Mullen | B64C 27/14 |
| 10,415,692 B2 * | 9/2019 | Lapeyre | F16H 57/0435 |
| 2010/0320019 A1 * | 12/2010 | Gale | B60K 6/445 180/65.27 |
| 2011/0150655 A1 * | 6/2011 | Tietze | F16H 57/0447 416/170 R |
| 2012/0227820 A1 * | 9/2012 | Poster | B64C 13/42 137/1 |
| 2014/0026988 A1 * | 1/2014 | Peterson | F16H 57/0443 137/544 |
| 2018/0363762 A1 * | 12/2018 | Kiyokami | F16H 57/04 |

FOREIGN PATENT DOCUMENTS

| | | |
|---|---|---|
| CN | 203548839 U | 4/2014 |
| CN | 103975180 A | 8/2014 |
| DE | 731447 C | 2/1943 |
| DE | 914502 B | 7/1954 |
| DE | 4224651 A1 | 1/1994 |
| DE | 102004052870 A1 | 6/2005 |
| DE | 10 2007 018 504 A1 | 10/2008 |
| DE | 102007022216 A1 | 11/2008 |
| DE | 102008043734 A1 | 5/2010 |
| DE | 102011075411 A1 | 11/2012 |
| DE | 102011077552 A1 | 12/2012 |
| DE | 102012025092 B3 | 3/2014 |
| EP | 1273829 A2 | 1/2003 |
| FR | 2386743 A1 | 11/1978 |
| JP | H06213308 A | 8/1994 |
| JP | 2008039079 A | 2/2008 |
| WO | 2014056728 A1 | 4/2014 |

OTHER PUBLICATIONS

Chinese Office Action dated Sep. 21, 2018, in connection with corresponding CN Application No. 201580059564.5 (19 pgs., including machine-generated English translation).

International Search Report dated Jan. 27, 2016 in corresponding PCT/EP2015/075506; 6 pages.

German Examination Report dated Jun. 18, 2015 in corresponding DE1020140161710; 7 pages.

Chinese Office Action dated Jun. 5, 2019, in connection with corresponding CN Application No. 2015800595645 (8 pgs., including machine-generated English translation).

* cited by examiner

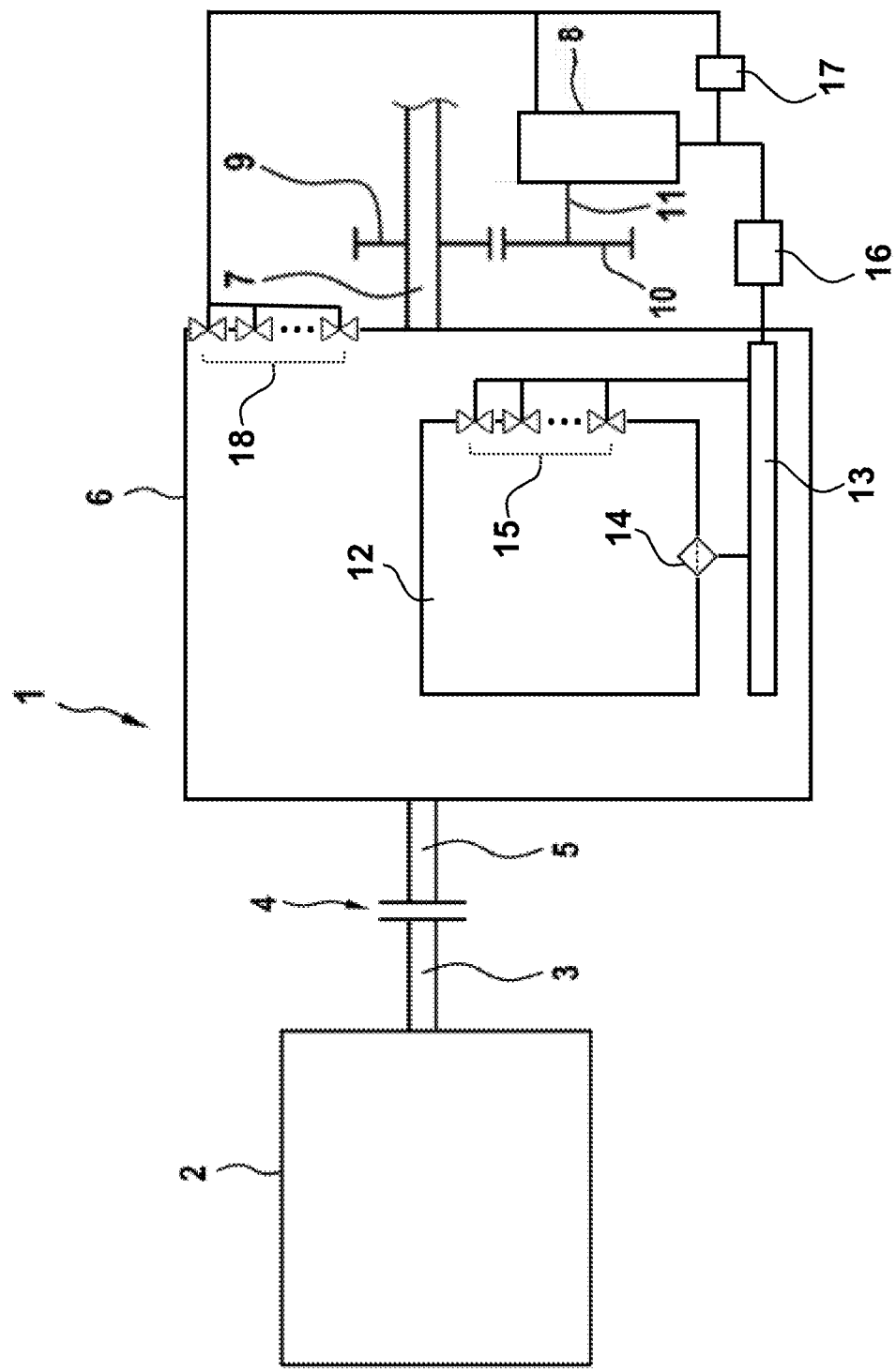

LUBRICATION SYSTEM FOR A DRIVE DEVICE OF A MOTOR VEHICLE

FIELD

The invention relates to a drive device for a motor vehicle, having a drive assembly that is operatively connected or can be operatively connected to an input shaft of a gearbox or manual transmission, wherein a gear set of the gearbox can be supplied with lubricant by means of a primary lubricant pump.

BACKGROUND

The drive device serves, for example, to supply a drive torque for carrying out a driving operation of the motor vehicle. The drive device is therefore preferably a component of the motor vehicle. The drive device provides the at least one drive assembly, which, for example, is designed as an internal combustion engine or as an electric motor. Obviously, the drive device can also have a plurality of drive assemblies, which, in this case, are preferably of differing type. Thus, a first drive assembly can be designed as an internal combustion engine and a second drive assembly as an electric motor.

The drive assembly is operatively connected or can be operatively connected via the gearbox to at least one drivable axle of the motor vehicle. Preferably, a clutch is present in the operative connection between the drive assembly and the at least one axle, in particular a starting clutch. The starting clutch is provided, for example, between the drive assembly and the input shaft of the gearbox. This means that, by means of the clutch, the operative connection between the drive assembly and the gearbox or the input shaft thereof can be alternatively engaged or disengaged.

By contrast, the at least one drivable axle of the motor vehicle is preferably operatively connected rigidly and/or permanently to the gearbox, in particular to an output shaft of the gearbox. This means that the output shaft is always rotating when drive operation of the motor vehicle is carried out, that is, for a speed of the motor vehicle that is different from zero.

With the aid of the gearbox, preferably a plurality of driving gears can be engaged in the form of mutually differing gear ratios between the input shaft and the output shaft of the gearbox. The driving gears comprise, for example, a plurality of forward gears as well as at least one, in particular exactly one, reverse gear. The different driving gears or gear ratios are realized with the aid of the gear set of the gearbox. The gear set has insofar, for example, one pair of gears for each driving gear, in particular one pair of toothed gears.

On account of the friction existing in the gearbox or in the gear set, in particular during drive operation of the motor vehicle, heat is produced. This heat needs to be dissipated in order to keep the temperature of the gearbox or of the gear set within allowable limits. In addition, a lubrication of the gear set is necessary. For this reason, lubricant is supplied to the gear set. This means that at least one gear, in particular a toothed gear wheel, of the gear set is supplied with the lubricant, preferably directly. More preferably, a plurality of, and in particular all gear wheels, of the gear set are supplied with the lubricant, in particular directly.

For example, the gear set can be lubricated or cooled by means of immersion lubrication. In the process, in simple terms, sufficient lubricant is poured into the gearbox until, for all pairs of gears, at least one gear wheel is immersed in the lubricant in each instance, preferably by several millimeters. However, this leads to a part of the gear wheels being immersed markedly deeper in the lubricant than is the case for other gear wheels. This leads to relatively high losses due to splashing.

Additionally or alternatively, the lubricant is supplied to at least one of the gear wheels directly. A direct supply of lubricant is to be understood in this case to mean, for example, that the lubricant issues downstream of the primary lubricant pump from an outlet point, in particular a nozzle, and, in doing so, is directed directly at the respective gear wheel. This is referred to as injection lubrication. With the aid of the injection lubrication, it is possible in theory to completely prevent any splashing.

Conveyance of the lubricant is provided with the aid of the primary lubricant pump. For example, this represents the sole conveying means for lubricant that is associated with the gearbox, in particular the gear set thereof. Lubricant is insofar conveyed to the gear set solely by means of the primary lubricant pump.

SUMMARY OF THE DISCLOSURE

It is now the object of the invention to propose a drive device for a motor vehicle, which, in comparison to prior art, offers advantages, in particular a higher efficiency, and hence makes possible a lower consumption of energy or fuel.

It is thereby provided that the primary lubricant pump is coupled to an output shaft of the gearbox.

Fundamentally, it is also obviously possible to couple the primary lubricant pump to the input shaft of the gearbox or to a drive shaft of the drive assembly. The drive shaft of the drive assembly is operatively connected to the input shaft, in particular via the above-discussed clutch or starting clutch. This means that the drive assembly or the drive shaft thereof is decoupled at least intermittently from the input shaft of the gearbox by means of the clutch; therefore, the operative connection between these is disengaged. Accordingly, the rotational speed of the primary lubricant pump corresponds to the rotational speed of the drive assembly, in particular when the clutch is engaged.

For a drive operation using driving gears with a smaller gear ratio, this leads in most driving conditions to an oversupply of lubricant. This means that the primary lubricant pump takes in more drive power than is actually required. In addition, increased squeeze losses can occur—depending on the design of the primary lubricant pump—which arise owing to the fact that the lubricant has to be squeezed out of the teeth contacts or gaps between the teeth. Beyond this, the primary lubricant pump is always operating, even in idling operation of the drive device, in which the clutch is engaged and no driving gear is engaged at the gearbox, even though no lubricant is required. Further losses thereby ensue.

In order to prevent this, the primary lubricant pump can be driven by means of an electric motor. This has the advantage that the amount of conveyed lubricant can be adjusted to each load condition of the drive device. However, because the energy required for the operation of the electric motor must be produced from the drive power of the drive assembly by means of a generator, the efficiency is relatively low and is, for example, at most 50%. In addition, a high available drive torque at a pump shaft of the primary lubricant pump is required in order to ensure an adequate amount of conveyed lubricant even at very low temperatures. A relatively large electric motor is insofar required. This results in costs and additional weight.

Alternatively, special measures could be taken for the lubrication of the gear set, such as, for example, carrying out an immersion lubrication at low temperatures and an injection lubrication at higher temperatures. However, this, too, is only possible with additional measures, which are extremely disadvantageous in terms of cost and weight. If the gearbox is designed as a manual transmission, a control unit would be required just for the electric motor. In addition, in the event of breakdown of the electric motor, the lubrication of the gearbox or of the gear set through corresponding measures needs to be ensured without the primary lubricant pump or an appropriate warning needs to be delivered to a driver of the motor vehicle.

From these considerations, it is insofar provided in accordance with the invention that the primary lubricant pump is coupled permanently to the output shaft of the gearbox, preferably rigidly and/or permanently. This means that the primary lubricant pump is constantly operated only when the output shaft of the gearbox is rotating. This is the case especially for a drive operation of the motor vehicle, that is, at a speed of the motor vehicle that differs from zero. As already mentioned above, preferably the gear set is lubricated solely by means of the primary lubricant pump. In light of what has been stated above, this means that the gear set is supplied with lubricant only when the output shaft of the gearbox is rotating—for example, because the speed of the motor vehicle differs from zero.

The coupling of the primary lubricant pump to the output shaft of the gearbox is understood to mean that a permanent operative connection exists between them. This does not mean, however, that the primary lubricant pump needs to be connected directly to the output shaft or needs to engage it directly, although this can obviously be the case. Instead, the primary lubricant pump shall be operatively connected permanently to the output side of the gearbox. Accordingly, the primary lubricant pump can also engage, in particular directly, at an intermediate shaft or a pinion shaft of the gearbox. More preferably, the primary lubricant pump is insofar in operative connection rigidly and/or permanently with at least one axle, in particular with at least one wheel of the motor vehicle provided on the axle.

The described embodiment offers the advantages that no control unit is necessary and, in addition, a high operating safety is afforded. In addition, the lubrication of the gearbox or the gear set is also possible at very low temperatures without problem and without special measures. Moreover, the proposed solution is very cost-effective in comparison to driving the primary lubricant pump by means of an electric motor.

In another embodiment of the invention, it is provided that, by means of the primary lubricant pump, it is additionally possible to supply lubricant to an output gear stage of the gearbox. The output gear stage is associated, in addition to the gearbox, with the gear set or forms a component of it. As already discussed above, the gear set has a plurality of gear pairs, by means of which the different driving gears or the different gear ratios of the gearbox can be realized. Via the gear set, the input shaft is insofar operatively connected or can be operatively connected to the intermediate shaft of the gearbox.

The operative connection between the input shaft and the intermediate shaft, as likewise already indicated above, can be disengaged when no driving gear is engaged at the gearbox. By contrast, the intermediate shaft is preferably operatively connected rigidly and/or permanently to the output shaft of the gearbox—for example, via the output gear stage. This means that, in the operative connection between the intermediate shaft and the output shaft, another pair of gears, in particular another pair of toothed gears, is present, via which the operative connection between the aforementioned shafts is produced. It is then provided that the primary lubricant pump provides lubricant not solely for the gear set, but additionally also for this output gear stage. For example, the output gear stage or the gear pair thereof is directly supplied with the lubricant, for example, by corresponding alignment of a nozzle provided downstream of the primary lubricant pump.

An enhancement of the invention provides that the primary lubricant pump is coupled to the output shaft independently of the direction of rotation. The direction of rotation of the output shaft differs for forward travel of the motor vehicle, for example, from the direction of rotation existing for reverse travel of the motor vehicle. It can now be provided that the primary lubricant pump is coupled to the output shaft in such a way that lubricant is supplied solely in the case of forward travel of the motor vehicle by means of the primary lubricant pump, that is, the gear set of the gearbox is only then supplied with the lubricant.

Preferably, however, the coupling of the primary lubricant pump to the output shaft is realized independently of the direction of rotation. This is accomplished, for example, by a corresponding coupling device in the operative connection between the primary lubricant pump and the output shaft. In this case, the coupling device has, for example, at least one freewheel, in particular a plurality of freewheels, as well as a reversal of the direction of rotation of the gear pair, in particular the toothed gear pair. For example, the primary lubricant pump is coupled, via one of the freewheels, to the output shaft in such a way that it is operated in the operational direction of rotation when the output shaft has a direction of rotation corresponding to forward travel of the motor vehicle. In order to engage also the opposite direction of rotation of the output shaft in the operational direction of rotation of the primary lubricant pump, in contrast, the output shaft is operatively connected to the primary lubricant pump, via another freewheel and the gear pair that reverses the direction of rotation. In this case, the two freewheels have oppositely directed freewheel directions.

Alternatively or additionally, the primary lubricant pump itself can obviously be dependent on the direction of rotation. For example, the primary lubricant pump has an operating principle that is independent of the direction of rotation and, in particular, exists as a piston pump. Additionally or alternatively, at least one valve, in particular a check valve, can be associated with the primary lubricant pump, so that it operates independently of the direction of rotation. In this case, for example, the primary lubricant pump can be designed as a gear pump. The at least one valve is associated with this pump. Preferably, a plurality of valves, in particular check valves, are provided—for example, exactly two valves or exactly four valves.

A preferred design of the invention provides that the lubricant is supplied to the gearbox through a plurality of nozzles. As already discussed above, the nozzles are preferably oriented in such a way that at least one gear pair of the gear set is supplied directly with the lubricant. More preferably, one of the nozzles is associated with each gear pair of the gear set and/or each pair of gears of the output gear stage, so that, in total, the number of nozzles corresponds to the number of gear pairs in the gear set and/or of the output gear stage.

An especially preferred design of the invention provides that at least one of the nozzles and/or a plurality of the nozzles is connected or are each connected via an aperture to a pressure line, wherein the pressure line is attached to a pressure side of the primary lubricant pump. The primary lubricant pump supplies lubricant from an intake side in the direction of the pressure side or on the pressure side. A higher pressure insofar exists on the pressure side than on the intake side. The pressure line is connected at the pressure side, so that the primary lubricant pump supplies the lubricant in the direction of the pressure line.

The lubricant is supplied via the pressure line to the nozzles, with one of the apertures being arranged in fluid mechanical terms between the pressure line and preferably each nozzle. Obviously, one of the apertures can also be present in each case only between the pressure line and one of the nozzles or a plurality of the nozzles. The apertures are preferably designed in such a way that each nozzle supplies the amount of lubricant required by it or the required lubricant throughput.

Theoretically, the pressure loss at the apertures is independent of the viscosity of the lubricant, so that they can be designed in such a way that, even in the case of very small mass flows of lubricant, the pressure loss at the apertures is sufficiently large to supply even geodetically higher-lying nozzles with an adequate amount of lubricant. In contrast to correspondingly dimensioned nozzles, the pressure loss occurring at the apertures is not too high, even at low temperatures, that is, with high viscosities.

In another embodiment of the invention, it is provided that the pressure side is connected via an overpressure value to an intake side of the primary lubricant pump and/or that the intake side of the primary lubricant pump is connected via a filter to a lubricant sump of the gearbox. For example, at very low lubricant temperatures and high speeds of travel, the pressure can rise very strongly on the pressure side of the lubricant pump. In order to avoid the necessity of designing pressure-carrying components for such a high pressure, it is possible to provide the overpressure valve, via which lubricant can reach the intake side from pressure side once the pressure on the pressure side exceeds a specific maximum pressure. The maximum pressure is, for example, at least 10 bars, at least 15 bars, or at least 20 bars.

Additionally or alternatively, the filter is arranged in the flow connection between the intake side of the primary lubricant pump and the lubricant sump of the gearbox. The pressure loss thereof can be chosen through a corresponding design of the filter in such a way that the pressure on the pressure side of the primary lubricant pump is likewise limited to the mentioned value. In fact, such a design may lead to cavitation in the primary lubricant pump, but it can, under certain circumstances, obviate the overpressure valve.

In another preferred embodiment of the invention, it is provided that the gearbox has a lubricant container that differs from the lubricant sump, to which at least one of the nozzles can supply lubricant directly. The lubricant sump lies, for example, at a geodetically lowest point of a lubricant circuit with which the primary lubricant pump as well as the lubricant sump are associated. The primary lubricant pump takes in the lubricant from the lubricant sump and conveys it in the direction of the gearbox or the gear set. Once the gear set has been supplied with the lubricant, the lubricant can reenter the lubricant sump, from which it can once again undergo intake by the primary lubricant pump.

In addition to the lubricant sump, the lubricant container is now provided. The container is supplied with lubricant through at least one of the nozzles when the primary lubricant pump conveys the lubricant. This nozzle, too, can be associated with one of the apertures in accordance with the above descriptions. During operation of the primary lubricant pump, the lubricant container is insofar filled with lubricant.

Another embodiment of the invention provides that the lubricant container, in particular at its geodetically lowest point, has an outlet, through which there is a direct flow connection to the lubricant sump. The lubricant can enter the lubricant sump of the gearbox from the lubricant container through the outlet. The outlet is preferably arranged in such a way that the lubricant container can drain completely, in particular if lubricant is no longer supplied to it. Correspondingly, the outlet needs to lie at the geodetically lowest point of the lubricant container.

In an enhancement of the invention, it is provided that the lubricant container has at least one overflow, which lies geodetically higher than the outlet and produces a direct flow connection to the lubricant sump. The overflow is insofar situated, for example, at a distance from the bottom of the lubricant container, with it being possible to arrange the outlet in the bottom. It is only important that, when the drive device is in an installed position, the lubricant container is designed in such a way that the outlet enables the lubricant container to empty completely, whereas this is not the case for the at least one overflow. By way of the overflow, lubricant should correspondingly only be able to flow out of the lubricant container when a specific minimum amount of lubricant is present in the lubricant container.

The lubricant can enter the lubricant sump directly from the lubricant container through the overflow. For example, the outlet and the overflow are connected to a common lubricant line, which, on its side facing away from the overflow and the outlet, opens into the lubricant sump. Preferably, a plurality of overflows are provided, some of which at least have dimensions that differ from the dimensions of other overflows.

In particular, the overflows are arranged, viewed geodetically, one above the other, with the overflows preferably being larger the higher they lie geodetically. The overflows are designed, for example, for the purpose of enabling an overflow of the lubricant from the lubricant container into the lubricant sump for a specific lateral acceleration and/or longitudinal acceleration of the motor vehicle and hence of the drive device. The overflow or the overflows are to be designed especially preferably in such a way that when a specific lateral acceleration and/or longitudinal acceleration is attained, the lubricant contained in the lubricant container enters the lubricant sump at least in large part, and in particular completely, through the overflow.

It is possible with such an embodiment of the lubricant container for the lubricant container to be full during constant travel of the motor vehicle, that is, for the lubricant level in the lubricant sump to be correspondingly lowered. During a full acceleration and/or travel around a curve at high lateral accelerations, in contrast, lubricant sloshes out of the lubricant container into the lubricant sump, as a result of which the lubricant level therein is raised. Correspondingly, it is ensured that the primary lubricant pump can constantly and reliably take in lubricant from the lubricant sump even at high lateral accelerations and/or longitudinal accelerations and therefore does not convey any air.

In principle, it would additionally be possible with such a design to ensure the lubrication and/or cooling of the gearbox during reverse travel of the motor vehicle, even without coupling of the primary lubricant pump to the output shaft independently of the direction of rotation. For this purpose, the lubricant container had to have taken up an adequate amount of lubricant in order to bridge a geodetic level difference between a pair of wheels of the reverse gear and lower-lying wheels or pairs of wheels, which are not to be immersed in the lubricant during constant travel.

Finally, in another embodiment of the invention, it can be provided that the gear set and/or the output gear stage have or has at least one toothed gear wheel, which engages in the lubricant sump. The toothed gear wheel is insofar arranged in the lubricant sump at least in regions, with this being provided preferably in such a way that, for a specific lubricant level in the lubricant sump, the toothed gear wheel is immersed in the lubricant at least in part.

Obviously, the invention further relates to a motor vehicle with a drive device that can be designed in accordance with the above embodiments.

BRIEF DESCRIPTION OF THE DRAWING

The invention will be explained below on the basis of the exemplary embodiments illustrated in the drawing, without resulting in any limitation of the invention. Shown in the sole FIGURE:

FIG. 1 is a schematic illustration of a drive device for a motor vehicle.

DETAILED DESCRIPTION

The FIGURE shows a schematic illustration of a drive device 1, which, for example, is a component of a motor vehicle, which is not illustrated in more detail. The drive device 1 has a drive assembly 2, which, for example, is present as an internal combustion engine. The drive assembly 2 provides a drive shaft 3, which is operatively connected or can be operatively connected via a clutch 4 to an input shaft 5 of a gearbox 6. The gearbox 6 further provides an output shaft 7, which is preferably operatively connected rigidly and/or permanently to at least one driven axle of the motor vehicle (not illustrated here).

The gearbox 6 provides a gear set, which is not illustrated here, via which the input shaft 5 is operatively connected or can be operatively connected to the output shaft 7. In this case, it is possible with the aid of the gearbox 6 to adjust different driving gears or gear ratios between the input shaft 5 and the output shaft 7.

The gear set of the gearbox 6 can be supplied with lubricant by means of a primary lubricant pump 8. The primary lubricant pump 8 is now coupled to the output shaft 7 of the gearbox 6. For this purpose, for example, a toothed gear wheel 9 is connected rigidly to the output shaft 7 or arranged on it. The toothed gear wheel 9 meshes with another toothed gear wheel 10, which, for example, is arranged on an input shaft 11 of the primary lubricant pump 8. Alternatively, however, it can also be provided to couple the primary lubricant pump 8 to the output shaft 7 independently of the direction of rotation, for which purpose a corresponding coupling device is provided.

Referring still to FIG. 1, in an exemplary embodiment, the gearbox 6 has a lubricant container 12 and a lubricant sump 13. The lubricant sump 13 lies, for example, at a geodetically lowest point of a lubricant circuit where the primary lubricant pump 8 as well as the lubricant sump 13 are associated. The lubricant container 12 has an outlet 14 at the geodetically lowest point of the lubricant container 12, and the lubricant can enter the lubricant sump 13 of the gearbox 6 from the lubricant container 12 through the outlet 14 because there is a direct flow connection to the lubricant sump 13 through the outlet 14. Also, in an exemplary embodiment, the lubricant container 12 has at least one overflow 15 which lies geodetically higher than the outlet 14 and produces a direct flow connection to the lubricant sump 13. Further, in an exemplary embodiment, the lubricant is supplied to the gearbox through a plurality of nozzles 18, and the plurality of the nozzles 18 are connected via the pressure line which attached to the pressure side of the primary lubricant pump 8. Also, the overpressure valve 17 may be provided, via which lubricant can reach the intake side of the pump 8 from the pressure side of the pump 8 once the pressure on the pressure side exceeds a specific maximum pressure, and the filter 16 may be arranged in the flow connection between the intake side of the pump 8 and the lubricant sump 13 of the gearbox 6.

The invention claimed is:

1. A drive device for a motor vehicle, comprising:
a drive assembly that is operatively connected to an input shaft of a gearbox, wherein a gear set of the gearbox is supplied with lubricant by a primary lubricant pump, wherein the gearbox has only one output shaft, and the primary lubricant pump is coupled to and driven by the only one output shaft of the gearbox,
wherein a pressure side is connected via an overpressure valve at an intake side of the primary lubricant pump and the intake side of the primary lubricant pump is connected via a filter to a lubricant sump of the gearbox,
wherein a lubricant container at a geodetically lowest point, has an outlet, through which a direct flow connection to the lubricant sump exists, and
wherein the lubricant container has at least two overflows, which lie geodetically higher than the outlet and produces a direct flow connection to the lubricant sump.

2. The drive device according to claim 1, wherein an output gear stage of the gearbox can additionally be supplied with lubricant by the primary lubricant pump.

3. The drive device according to claim 1, wherein the primary lubricant pump is coupled to the output shaft independently of a direction of rotation of the output shaft.

4. The drive device according to claim 1, wherein the lubricant is supplied to the gearbox through a plurality of nozzles.

5. The drive device according to claim 4, wherein at least one nozzle of the plurality of nozzles is connected via an aperture to a pressure line, wherein the pressure line is connected to the pressure side of the primary lubricant pump.

6. The drive device according to claim 1, wherein the gearbox has the lubricant container that is different from the lubricant sump and is configured to supply said lubricant container with lubricant directly through at least one nozzle.

7. The drive device according to claim 1, wherein the gear set and an output gear stage has at least one toothed gear wheel that engages in the lubricant sump.

* * * * *